US008041112B2

(12) United States Patent
Ohtsu

(10) Patent No.: US 8,041,112 B2
(45) Date of Patent: Oct. 18, 2011

(54) IMAGE PROCESSING APPARATUS, IMAGE FORMING APPARATUS, IMAGE READING APPARATUS, IMAGE PROCESSING METHOD, IMAGE PROCESSING PROGRAM, COMPUTER-READABLE STORAGE MEDIUM FOR STORING THE IMAGE PROCESSING PROGRAM WITH SEGMENTATION AND DENSITY CORRECTION OPTIMIZATION

(75) Inventor: Makoto Ohtsu, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1238 days.

(21) Appl. No.: 11/514,073

(22) Filed: Aug. 30, 2006

(65) Prior Publication Data

US 2007/0047805 A1    Mar. 1, 2007

(30) Foreign Application Priority Data

Aug. 31, 2005  (JP) .................................. 2005-252732

(51) Int. Cl.
*G06K 9/34*         (2006.01)
(52) U.S. Cl. ........................ 382/173; 382/164
(58) Field of Classification Search ............... 382/164, 382/173
See application file for complete search history.

(56) References Cited

U.S. PATENT DOCUMENTS

| 6,542,173 B1 * | 4/2003 | Buckley ......................... 715/841 |
| 2003/0133154 A1 * | 7/2003 | Ohyama et al. ............... 358/1.15 |
| 2005/0078867 A1 * | 4/2005 | Kanno ........................... 382/163 |

FOREIGN PATENT DOCUMENTS

| JP | 02-199588 | 8/1990 |
| JP | 05-130398 | 5/1993 |
| JP | 2002-171404 | 6/2002 |
| JP | 2002-232708 | 8/2002 |
| JP | 2004-023174 A | 1/2004 |
| JP | 2006-020064 A | 1/2006 |

OTHER PUBLICATIONS

Toshiyuki Takahashi et al.; "*Bi-level Quantizing Method for Images Containing Text, Screened Halftone and Continuous Tone*"; The Institute of Image Electronics Engineers of Japan, Workshop Proceedings Jun. 4, 1990; pp. 19-24.

* cited by examiner

*Primary Examiner* — Vikkram Bali
*Assistant Examiner* — Eueng-Nan Yeh
(74) *Attorney, Agent, or Firm* — Edwards Angell Palmer & Dodge LLP; David G. Conlin; David A. Tucker

(57) ABSTRACT

The image processing apparatus according to the present invention includes: a segmentation process section for performing a segmentation process with respect to image data corresponding to an image to be processed; first and second input tone correction sections each of which performs a density correction process with respect to the image data by referring to a conversion curve which indicates a relation between density before correction and density after correction; and a processing mode control section for switching between (i) a first processing mode in which the segmentation process is performed with respect to the image data having been subjected to the density correction process and (ii) a second processing mode in which the segmentation process is performed with respect to image data having not been subjected to the density correction process. Therefore, the image processing apparatus can perform the segmentation process with high accuracy.

11 Claims, 10 Drawing Sheets

IMAGE PROCESSING APPARATUS, IMAGE FORMING APPARATUS, IMAGE READING APPARATUS, IMAGE PROCESSING METHOD, IMAGE PROCESSING PROGRAM, COMPUTER-READABLE STORAGE MEDIUM FOR STORING THE IMAGE PROCESSING PROGRAM WITH SEGMENTATION AND DENSITY CORRECTION OPTIMIZATION

This non-provisional application claims priority under 35 U.S.C. §119(a) on Patent Application No. 2005-252732 filed in Japan on Aug. 31, 2005, the entire contents of which are hereby incorporated by reference.

FIELD OF THE INVENTION

The present invention relates to an image processing apparatus, an image forming apparatus, an image reading apparatus, an image processing method, an image processing program, and a computer-readable storage medium for storing the image processing program, each of which allows input image data to be processed.

BACKGROUND OF THE INVENTION

The advance of digital image processing techniques has allowed image forming apparatuses such as copying machines and printers based on an electrophotography method or an ink-jet method to reproduce color images with high quality, and accordingly digital copying machines and digital multifunction printing apparatuses with full colors have been commercially available.

Documents to be copied by such image forming apparatuses include text areas, halftone dot areas, line areas, and continuous tone image areas (photographic-pictures). Further, these areas may be mixed in a single document. As such, in order to obtain a good reproduction image (copied image), it is necessary to perform the most suitable image process according to the type of areas included in each document.

Therefore, a so-called segmentation process is performed in such image forming apparatuses. The segmentation process is a process in which: in image data to be processed, a mask centering a current pixel is used to find "an image area into which the current pixel is classified", and a segmentation class signal indicative of the image area is outputted. Examples of the image areas classified by the segmentation process include text areas, halftone dot areas, and other areas (areas which are not classified as text areas and halftone dot areas, such as continuous tone image areas and page background areas).

Generally, in the segmentation process, an input image read by an image input apparatus such as a scanner is separated into blocks each constituted of a plurality of pixels and each pixel or each block is judged to be (identified with) one of a text area, a halftone dot area, and other area. Then, based on the result of the judgment, an image process most suitable for the area is performed according to the type of areas included in a document.

Further, as an example of the segmentation process, there is known the technique disclosed in Document 1: Japanese Unexamined Patent Publication No. 199588/1990 (Tokukaihei 2-199588; published on Aug. 7, 1990). The following shortly explains the procedure of the technique. In the technique disclosed in Document 1, in view of characteristics of a page background (wide area, uniformity and continuity of density (pixel value) or color), an area having the same density as the page background or an area having a uniform color is judged to be a page background density area. Further, it is judged whether the page background density area is a page background area or not in accordance with the size or the like of the page background density area. Thereafter, out of a non-page background area, an area whose size is not more than a predetermined size is identified as a text area and an area whose size is more than the predetermined size is identified as a halftone dot area.

Further, in the above image forming apparatus, it is necessary to perform not only the segmentation process but also correction of density of an input image. In terms of this point, Document 2: Japanese Unexamined Patent Publication No. 130398/1993 (Tokukaihei 5-130398; published on May 25, 1993) discloses a full color imaging apparatus having (i) a function for allowing a user to set γ characteristics (a relation between density of a document image and density of a copied image) which are recommended in advance so as to correspond to the type of a document, merely by selecting the type of the document, and (ii) a function for allowing a user to exactly adjust γ characteristics. The full color imaging apparatus allows exact adjustment of γ characteristics at a time when a person skilled in printing (such as designer or the like) performs copies, while the full color imaging apparatus allows easy setting of γ characteristics suitable for the type of the document merely by selecting the type of the document at a time when a normal user performs copies. Therefore, the technique allows a user to set γ characteristics with an operation function suitable for the user's skill.

Further, Document 3: Japanese Unexamined Patent Publication No. 171404/2002 (Tokukai 2002-171404; published on Jun. 14, 2002) discloses an image processing apparatus capable of performing a segmentation process and a density conversion process in this order.

In the above image forming apparatus, in order to enhance readability of a text in printed images, a text area is detected in the segmentation process and an edge enhancement process is performed with respect to the text area. As such, it is necessary to detect a text area with high accuracy in the segmentation process.

Generally, in the segmentation process, a high density part on a white page background area is detected as a text area on the premise that "a text normally exists on a white page background". As such, when the segmentation process is performed with respect to a document image whose density is corrected so that page background density is removed, it is possible to detect, as text areas, not only a text surrounded by a white page background but also a text surrounded by a page background having density (such as a text on news papers), so that it is possible to detect a text with higher accuracy.

However, when the segmentation process is performed with respect to the image whose density is corrected so that page background density is removed, there is such a problem that an area other than a text is detected as a text area. For example, in a case where a photographic-picture area is included in an image, when the density correction is performed, density of a low density area surrounding an edge portion of the photographic-picture area may be removed. At that time, the edge portion is detected as a high density part existing on the white page background. As a result, the edge portion is wrongly detected as a text, and accordingly not only detection accuracy of a text area but also detection accuracy of the photographic-picture area drops. As such, it is impossible to perform the segmentation process with high accuracy.

On the other hand, in order to suppress wrong detection of the edge portion of the photographic-picture, the segmentation process should be performed based on the image whose density is not corrected. At that time, even when a low density area exists around the edge portion of the photographic-picture, the segmentation process is performed based on an image which keeps enough density in the low density area. As a result, the edge portion is not detected as the high density part on the white page background, so that it is possible to suppress wrong detection of the edge portion as a text. However, in a case where the segmentation process is performed with respect to the image which has not been subjected to the density correction, density of a page background having certain density is not removed, so that it is difficult to detect a text on the page background having certain density (a text on news papers). As a result, it is impossible to perform the segmentation process with high accuracy.

Namely, whether the density correction is performed or not before the segmentation process depends on the kinds and characteristics of a document image to be processed. In order to perform the segmentation process with high accuracy, the order of the segmentation process and the density correction process should not be fixed.

SUMMARY OF THE INVENTION

The present invention was made in view of the foregoing problems. An object of the present invention is to provide an image processing apparatus, an image forming apparatus, an image reading apparatus, an image processing method, an image processing program, and a computer-readable storage medium for storing the image processing program, each of which allows for performing a segmentation process with high accuracy.

In order to achieve the foregoing object, an image processing apparatus according to the present invention includes: segmentation process means for performing a segmentation process with respect to image data; density correction means for performing a density correction process with respect to the image data by referring to density correcting data which indicates a relation between density before correction and density after correction; and processing mode control means for switching between (i) a first processing mode in which the segmentation process is performed with respect to the image data having been subjected to the density correction process and (ii) a second processing mode in which the segmentation process is performed with respect to image data having not been subjected to the density correction process.

With the arrangement, when the segmentation process and the density correction process are performed with respect to the image data, it is possible to switch between (i) a mode in which the segmentation process is performed with respect to the image data having been subjected to the density correction process and (ii) a mode in which the segmentation process is performed with respect to the image data having not been subjected to the density correction process. As a result, as to an image whose accuracy in the segmentation process is higher when the segmentation process is performed after the density correction process, the segmentation process is performed with respect to image data having been subjected to the density correction process. As to an image data whose accuracy in the segmentation process is higher when the segmentation process is performed without performing the density correction process, the segmentation process is performed with respect to image data having not been subjected to the density correction process. In this way, two modes are compatible. Therefore, it is possible to increase the accuracy in the segmentation process, compared with a conventional image processing apparatus in which the order of the density correction process and the segmentation process is fixed.

For a fuller understanding of the nature and advantages of the invention, reference should be made to the ensuing detailed description taken in conjunction with the accompanying drawings.

DESCRIPTION OF THE EMBODIMENTS

Figure 1:
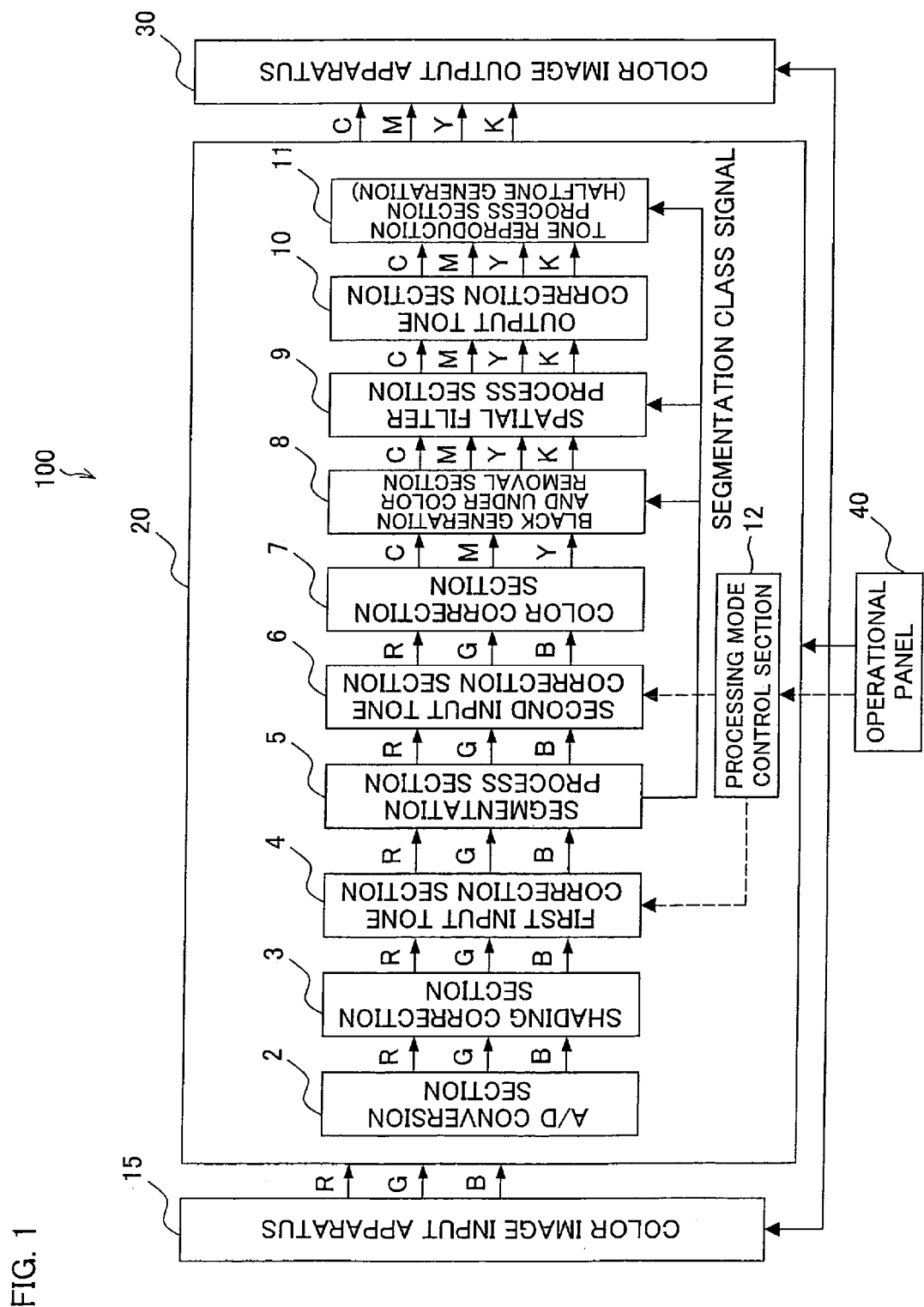
FIG. 1 is a block diagram illustrating a structure of an image forming apparatus including an image processing apparatus according to an embodiment of the present invention.

With reference to FIG. 1, the following explains an embodiment of the present invention. FIG. 1 is a block diagram illustrating a structure of a color image forming apparatus including a color image processing apparatus according to the present embodiment. In the present embodiment, the color image forming apparatus is explained using a digital color copying machine as an example.

(Whole Structure of Color Image Forming Apparatus)

As illustrated in FIG. 1, a color image forming apparatus 100 according to the present embodiment includes: a color image input apparatus 15; a color image processing apparatus 20; a color image output apparatus 30; and an operational panel 40. Note that, hereinafter, the color image input apparatus 15 is referred to as an image input apparatus 15, the color image processing apparatus 20 is referred to as an image processing apparatus 20, and the color image output apparatus 30 is referred to as an image output apparatus 30.

As illustrated in FIG. 1, the image processing apparatus 20 includes: an A/D (analog/digital) conversion section 2; a shading correction section 3; a first input tone correction section 4; a segmentation process section 5; a second input tone correction section 6; a color correction section 7; a black generation and under color removal section 8; a spatial filter process section 9; an output tone correction section 10; a tone reproduction process section 11; and a processing mode control section 12. Further, the image input apparatus 15 and the image output apparatus 30 are connected with the image processing apparatus 20. The image input apparatus 15, the image output apparatus 30, and the image processing apparatus 20 constitute the image forming apparatus 100 as a whole.

The image input apparatus (image reading means) 15 is constituted of a scanner section including a CCD (Charge Coupled Device) for example. The image input apparatus 15 reads a reflective light image from a document as analog RGB signals (red, green, and blue) by use of the CCD, and outputs the analog RGB signals to the image processing apparatus 20. The image output apparatus 30 is an apparatus to which image data having been subjected to a predetermined image process carried out by the image processing apparatus 20 is inputted and which outputs an image as printings (prints an image) on the basis of the image data.

The signals read out by the image input apparatus 15 are transmitted to each section of the image processing apparatus 20 in the order of the A/D conversion section 2, the shading correction section 3, the first tone correction section 4, the segmentation process section 5, the second input tone correction section 6, the color correction section 7, the black generation and under color removal section 8, the spatial filter process section 9, the output tone correction section 10, and the tone reproduction process section 11, and are outputted to the image output apparatus 30 as digital color signals of C (cyan), M (magenta), Y (yellow), and K (black).

The A/D conversion section 2 converts the analog RGB signals transmitted from the image input apparatus 15 into digital RGB signals and outputs the digital RGB signals to the shading correction section 3.

The shading correction section 3 performs a process for removing various distortions generated in an illumination system, an image focusing system, and an image sensing system of the image input apparatus 15 from the digital RGB signals transmitted from the A/D conversion section 2. Further, the shading correction section 3 performs a process for converting the digital RGB signals (RGB reflectance signals) into digital signals (density signals) which are easily dealt with by an image processing system included in the image processing apparatus 20, and the shading correction section 3 performs a process for adjusting color balance. Then, the digital RGB signals having been subjected to various processes carried out by the shading correction section 3 are transmitted to the first input tone correction section 4.

Here, the digital RGB signals outputted from the shading correction section 3 are 8-bit image data indicative of gray level ranging from 0 (black) to 255 (white). Namely, as a signal value is lower, an image has higher density, and as a signal value is higher, an image has lower density.

The first input tone correction section 4 and the second input tone correction section 6 perform density adjustment (image quality adjustment) such as removal of page background density, adjustment of contrast, and gamma correction. To be specific, the first input tone correction section 4 and the second input tone correction section 6 convert signal values of digital RGB signals on the basis of commands inputted by a user or predetermined settings, thereby performing a density correction process (input tone correction) with respect to image data.

Here, the first input tone correction section (density correction means, first density correction means) 4 converts the digital RGB signals transmitted from the shading correction section 3 and thus performs the density correction process, and outputs the digital RGB signals to the segmentation process section 5. The second input tone correction section (density correction means, second density correction means) 6 converts the digital RGB signals transmitted from the segmentation process section 5 and thus performs the density correction process, and outputs the digital RGB signals to the color correction section 7.

Note that, the first input tone correction section 4 and the second input tone correction section 6 perform the same process. When the first input tone correction section 4 performs the density correction process, the second input tone correction section 6 does not perform the density correction process and transmits the digital RGB signals to the color correction section 7 without converting the digital signals. When the second input tone correction section 6 performs the density correction process, the first input tone correction section 4 does not perform the density correction process and transmits the digital RGB signals to the segmentation process section 5 without converting the digital signals.

The segmentation process section (segmentation process means) 5 performs the segmentation process in which an input image is divided into text areas, halftone dot areas, and other areas, on the basis of the digital RGB signals inputted by the first input tone correction section 4. To be specific, the segmentation process section 5 finds, on the basis of the digital RGB signals, an image area into which each pixel in the input image is classified, and generates a segmentation class signal indicative of the image area, and outputs the segmentation class signal to the black generation and under color removal section 8, the spatial filter process section 9, and the tone reproduction process section 11. Here, examples of image areas classified by the segmentation process section 5 include a text area, a halftone dot area, and other areas (areas which are not classified as a text area and a halftone dot area, such as a continuous tone image area (e.g. a photographic-picture) and a page background area).

Note that, the segmentation process section 5 outputs the digital RGB signals inputted from the first input tone correction section 4 to the second input tone correction section 6 without converting the digital RGB signals.

The first input tone correction section 4, the second input tone correction section 6, and the segmentation process section 5 are detailed later.

The color correction section 7 performs a color correction process so as to reproduce colors exactly. To be specific, the color correction section 7 performs a process for removing, from the digital RGB signals inputted from the second input tone correction section 6, color impurity based on spectral characteristics of CMY color components including useless absorption components, and outputs CMY signals generated in the process to the black generation and under color removal section 8.

The black generation and under color removal section 8 converts three-colored CMY signals into four-colored CMYK signals. To be specific, the black generation and under color removal section 8 performs a black generation process for generating a K signal from three-colored CMY signals which are inputted from the color correction section 7 and which have been subjected to the color correction process, while the black generation and under color removal section 8 performs a process for removing, from the CMY signals, the K signal obtained in black generation so as to generate new CMY signals. Namely, three-colored CMY signals are converted by the black generation and under color removal section 8 into the four-colored CMYK signals and then outputted to the spatial filter process section 9.

Note that, an example of the black generation process is a method (general method) for generating black by carrying out UCR (Under Color Removal). In the method, assuming that: input/output characteristics of a black generation curve is y=f (x), input data items are C, M, and Y, output data items are C', M', Y', and K', and UCR (Under Color Removal) ratio is $\alpha$ ($0<\alpha<1$), the black generation and under color removal process is represented by the following equations (1) to (4).

$$K'=f\{\min(C,M,Y)\} \quad (1)$$

$$C'=C-\alpha K' \quad (2)$$

$$M'=M-\alpha K' \quad (3)$$

$$Y'=Y-\alpha K' \quad (4)$$

The spatial filter process section 9 performs a spatial filter process with respect to image data indicated by the CMYK signals inputted from the black generation and under color removal section 8, so that spatial frequency characteristics are corrected and accordingly blurs and rough graininess of an output image are prevented. The output tone correction section 10 performs an output tone correction process for converting a signal such as a density signal into a halftone dot area ratio which is a characteristic of the image output apparatus 30. The tone reproduction process section 11 performs a tone reproduction process (halftone generation) with respect to the image data indicated by the CMYK signals, the tone reproduction process being such that: based on the segmentation class signal, the image data is processed so that the image is finally divided into pixels and tone of each pixel is reproduced.

For example, an area having been divided into a text and a text surrounded by a halftone dot area by the segmentation process section 5 is subjected to an edge enhancement process carried out by the spatial filter process section 9 by use of a spatial filter, so that a high frequency is more enhanced, thereby enhancing reproducibility of an achromatic text (black text) or a chromatic text (color text). At the same time, in the tone reproduction process section 11, either binarization or multi-level dithering is performed in a screen with high resolution suitable for reproducing broadband high frequency.

Further, with respect to an area having been classified as a halftone dot area by the segmentation process section 5, the spatial filter process section 9 performs a low-path filter process so as to remove input halftone dot components. Then, the output tone correction section 10 performs an output tone correction process for converting a signal such as a density signal into a halftone dot area ratio which is a characteristic of the color image output apparatus 30. Thereafter, the tone reproduction process section 11 performs the tone reproduction process (halftone generation) for finally dividing an image into pixels so as to reproduce tone of each pixel.

With respect to an area having been classified as other area by the segmentation process section 5, the spatial filter process section 9 performs a low-path filter process for removing noise, on condition that sharpness does not drop.

(Segmentation Process Section)

Next, the following details the segmentation process section 5. The segmentation process section 5 performs the segmentation process with respect to image data. To be specific, the segmentation process section 5 performs a process for finding, on the basis of inputted digital RGB signals, an area into which each pixel of the inputted image is classified, the area being one of a text area, a halftone dot area, and other area (a continuous tone image area and a page background area which are not classified as the text area and the halftone dot area). Here, the process is realized by a well known method. In the segmentation process section 5 according to the present invention, the process is performed based on the method disclosed in The Institute of Image Electronics Engineers of Japan, Workshop Proceedings 90-06-04. The following details the segmentation process section 5.

Figure 2:
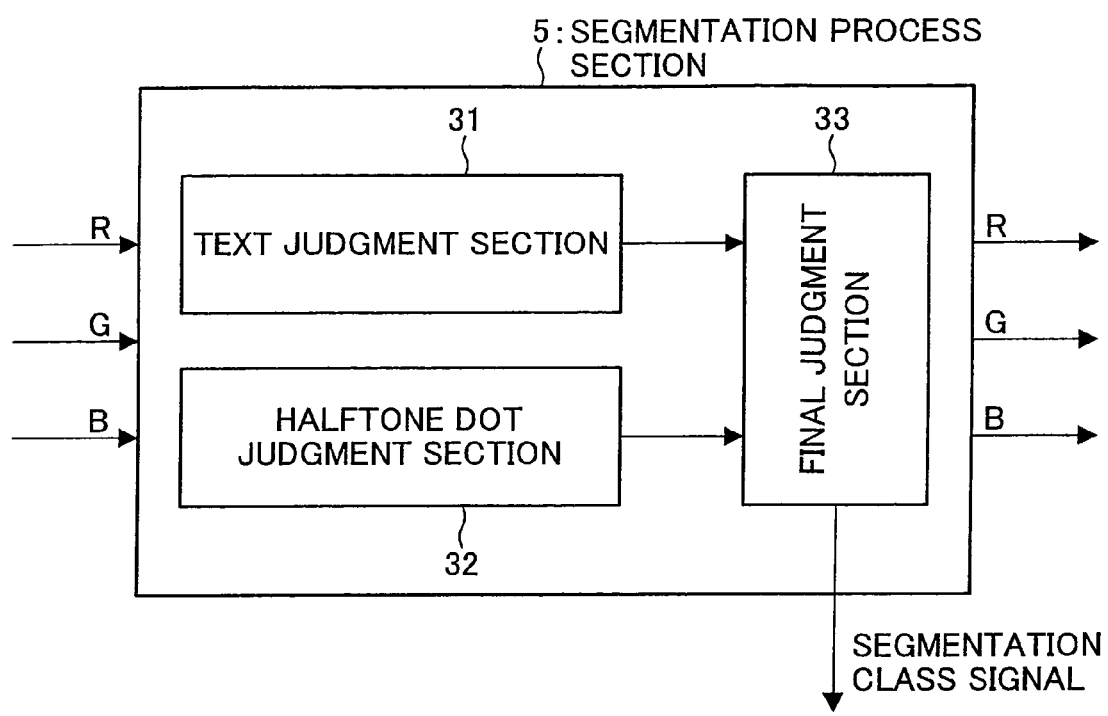
FIG. 2 is a block diagram illustrating a structure of a segmentation process section included in the image processing apparatus illustrated in FIG. 1.

FIG. 2 is a block diagram illustrating a detailed structure of the segmentation process section 5. As illustrated in FIG. 2, the segmentation process section 5 includes a text judgment section 31, a halftone dot judgment section 32, and a final judgment section 33.

Note that, in the segmentation process section 5, a block having M×N (M and N are natural numbers) pixels and centering a single current pixel is referred to, and an average value ($D_{ave}$) of signal levels of the pixels in the block is calculated, and the calculated average value is used to binarize image data indicative of each pixel in the block. Further, a maximum pixel signal level ($D_{max}$) and a minimum pixel signal level ($D_{min}$) in the block are calculated at the same time. Further, the text judgment section 31, the halftone dot judgment section 32, and the final judgment section 33 perform the following process with respect to each current pixel on the basis of the calculated $D_{ave}$, $D_{max}$, and $D_{min}$.

The text judgment section 31 is a block for performing a process for judging whether the current pixel belongs to a text area or not. To be specific, the text judgment section 31 judges a current pixel satisfying the following condition (5) to be a text area and outputs, to the final judgment section 33, a text/non-text area judgment signal indicating that the current pixel is judged to be the text area (a text/non-text judgment signal indicated by "1"). Further, the text judgment section 31 judges a current pixel which does not satisfy the condition (5) to be a non-text area and outputs, to the final judgment section 33, a text/non-text area judgment signal indicating that the current pixel is judged to be the non-text area (a text/non-text judgment signal indicated by "0").

$$D_{max}>PA \text{ and } (D_{sub}>PC \text{ or } D_{min}<PB) \quad (5)$$

Note that, $D_{sub}=D_{max}-D_{min}$ and PA, PB, and PC are threshold values.

The following explains the condition (5). It is deemed that, in a text area, the difference between the maximum signal level and the minimum signal level is large and density is high (namely, a signal value is small). Therefore, it is judged whether or not a text exists, by using the condition in the parentheses of (5).

Further, a text exists generally on a white page background. Besides, when a text having high page background density is detected and is subjected to an enhancement process, a part around the text is whited out, detection accuracy is deteriorated, some parts are not detected, and accordingly image quality is deteriorated. Therefore, the judgment is based not only on the condition in the parentheses of (5) but also on the condition that the maximum signal level is larger than a predetermined value (Dmax>PA). Further, the condition is preferable in reducing a possibility that an edge portion of a photographic-picture is detected as a text.

The halftone dot judgment section 32 is a block for performing a process for judging whether a current pixel belongs to a halftone dot area or not. To be specific, the halftone dot judgment section 32 judges a current pixel satisfying the following condition (6) to be a halftone dot area and outputs, to the final judgment section 33, a halftone dot/non-halftone dot area judgment signal indicating that the current pixel is judged to be the halftone dot area (a halftone dot/non-halftone dot judgment signal indicated by "1"). Further, the halftone dot judgment section 32 judges a current pixel which does not satisfy the condition (6) to be a non-halftone dot area and outputs, to the final judgment section 33, a halftone dot/non-halftone dot area judgment signal indicating that the current pixel is judged to be the non-halftone dot area (a halftone dot/non-halftone dot judgment signal indicated by "0").

$$D_{max}-D_{ave}>B1 \text{ and } D_{ave}-D_{min}>B2 \text{ and } K_H>T_H \text{ and } K_V>T_V \quad (6)$$

The following explains the condition (6). In the halftone dot area, an image signal in a small area greatly varies and the area has higher density than that of its background. Therefore, both in a main scanning direction and a sub scanning direction in the block, the number of density transition from 0 to 1 and the number of density transition from 1 to 0 in binarized data are counted, and the number of density transition in the main scanning direction is regarded as $K_H$ and the number of density transition in the sub scanning direction is regarded as $K_V$. Then, $K_H$ and $K_V$ are compared with threshold values $T_H$ and $T_V$. When $K_H$ and $K_V$ exceed the threshold values, the current pixel is judged to be the halftone dot area. Further, in order to prevent the current pixel from being wrongly judged to be the background, the difference between $D_{max}$ and $D_{ave}$ and the difference between $D_{ave}$ and $D_{min}$ are compared with threshold values B1 and B2. When each of the differences exceeds the threshold values, it is judged to be the halftone dot area.

The final judgment section 33 finally finds an area into which the current pixel is classified, on the basis of the text/non-text judgment signal transmitted from the text judgment section 31 and the halftone dot/non-halftone dot judgment signal transmitted from the halftone dot judgment section 32, and outputs a segmentation class signal which indicates the area. To be specific, the final judgment section 33 finally performs the judgment on the basis of a Table 1 indicated below.

TABLE 1

| Text/non-text judgment signal | Halftone dot/non-halftone dot judgment signal | Final judgment |
| --- | --- | --- |
| 1 | 0 | Text area |
| 0 | 1 | Halftone dot area |
| 0 | 0 | Other area |
| 1 | 1 | Halftone dot area |

Namely, the current pixel judged to be the text area and the non-halftone dot area is finally judged to be the text area, the current pixel judged to be the non-text area and the halftone dot area is finally judged to be the halftone dot area, and the current pixel judged to be the non-text area and the non-halftone dot area is finally judged to be other area (area which is not classified as a text area and a halftone dot area, such as a continuous tone image area (e.g. a photographic-picture) and a page background area). Further, the current pixel judged to be the text area and the halftone dot area is finally judged to be the halftone dot area because characteristics of halftone dots are detected.

Then, the segmentation class signal outputted from the final judgment section 33 is transmitted to the black generation and under color removal section 8, the spatial filter process section 9, and the tone reproduction process section 11.

(Input Tone Correction Section)

Next, the following details the first input tone correction section 4 and the second input tone correction section 6. The first input tone correction section 4 and the second input tone correction section 6 perform the density correction process with reference to one of conversion curves (density correcting data) illustrated in FIGS. 4(a) to 4(c). Note that, the conversion curve to be referred to may be predetermined, may be determined according to the type of a document (at that time, a later-mentioned document type discrimination section may be used), or may be determined according to commands inputted by a user. Further, the conversion curve may be rewritten according to the commands inputted by the user.

In each of FIGS. 4(a) to 4(c), the horizontal axis indicates an input signal value (density before correction) and the vertical axis indicates an output signal value (density after correction). The first input tone correction section 4 and the second input tone correction section 6 convert an input signal value in digital RGB signals into an output signal value one by one with reference to the conversion curve illustrated in FIGS. 4(a) to 4(c) and output the converted signal to subsequent stages.

Namely, the conversion curve is data indicating the relation between the density before correction and the density after correction. The first input tone correction section 4 and the second input tone correction section 6 convert the input signal value in the digital RGB signals into the output signal value with reference to the conversion curve illustrated in FIGS. 4(a) to 4(c), thereby performing the density correction process with respect to image data.

Further, the object of each of the conversion curves in FIGS. 4(a) to 4(c) is correction of density. Particularly, the main object of the conversion curve in FIG. 4(a) is removal of density of a page background area. The main object of the conversion curve in FIG. 4(b) is generation of an image having clear contrast of density. The conversion curve in FIG. 4(c) is used to emphasize the gradation.

Note that, in each of the conversion curves in FIGS. 4(a) to 4(c), an input signal value having low density is converted into an output signal value having lower density. Therefore, each of the conversion curves in FIGS. 4(a) to 4(c) allows for the density correction process in which density of the page background area is reduced, though the reduction varies according to the conversion curve.

Further, the first input tone correction section 4 and the second input tone correction section 6 may be arranged so as to calculate an output signal value from an input signal value by using a conversion function (tone correcting data) for converting an input signal value into an output signal value, instead of using the conversion curves.

(Order of Segmentation Process and Density Correction Process)

In the present embodiment, the order of the segmentation process and the density correction process is changed in the image processing apparatus 20 according to the type of a document to be read out by the image input apparatus 15. The following details a process for changing the order.

As illustrated in FIG. 1, the image processing apparatus 20 includes the processing mode control section (processing mode control means) 12 and is connected with the operational panel 40.

The operational panel 40 is constituted of: setting buttons for setting the operation mode of the image forming apparatus 100; numerical keys; and a display section such as a liquid crystal display, and serves as an input section with which the user inputs various commands.

Further, in the present embodiment, when the user selects, by use of the operational panel 40, the type of a document to be read by the image input apparatus 15, a document type signal (document type information) for indicating the type of the document is transmitted from the operational panel 40 to the processing mode control section 12.

Note that, examples of selectable documents at least include a text printing document and a text photographic paper document. In the present embodiment, the text printing document is a document which does not include a continuous tone image area such as a photographic-picture and is a document such as (i) a document made of a halftone dot area, (ii) a document made of a text area, and (iii) a document in which the halftone dot area and the text area are mixed with each other (news papers, magazines, maps and the like). Further, the text photographic paper document is a document which at least partially includes a continuous tone image area such as a photographic-picture and is a document such as (i) a document made solely of the continuous tone image area, (ii) a document in which the continuous tone image area and the halftone dot area are mixed with each other, and (iii) a document in which the continuous tone image area and the text area are mixed with each other.

Here, the continuous tone image area is not an area constituted of halftone dots but an area whose tones are continuously made with silver particles or dye particles. To be specific, the continuous tone image area indicates an area made of a photographic-picture, an image area printed by a dye sublimation printer or a thermal transfer printer.

The processing mode control section 12 is a block for performing a process for switching modes, in which the digital RGB signals are processed, according to the document type signal transmitted from the operational panel 40. To be specific, the processing mode control section 12 refers to a Table 2 as indicated below. When the document type signal indicates the text printing document, the processing mode control section 12 selects a first processing mode. When the document type signal indicates a text photographic paper document, the processing mode control section 12 selects the second processing mode.

TABLE 2

| Document type signal | Processing mode |
| --- | --- |
| Text printing document | First processing mode |
| Text photographic paper document | Second processing mode |

Here, the first processing mode is a mode in which the segmentation process is performed on the basis of the digital RGB signals having been subjected to the density correction process. The second processing mode is a mode in which the segmentation process is performed on the basis of the digital RGB signals having not been subjected to the density correction process.

To be specific, in a case where the processing mode control section 12 selects the first processing mode (in a case of the text printing document), the processing mode control section 12 transmits an execute command for indicating execution of the density correction process to the first input tone correction section 4 and transmits a prohibition command for prohibiting the density correction process to the second input tone correction section 6. Further, in a case where the processing mode control section 12 selects the second processing mode (in a case of the text photographic paper document), the processing mode control section 12 transmits the prohibition command to the first input tone correction section 4 and transmits the execute command to the second input tone correction section 6.

Figure 3:
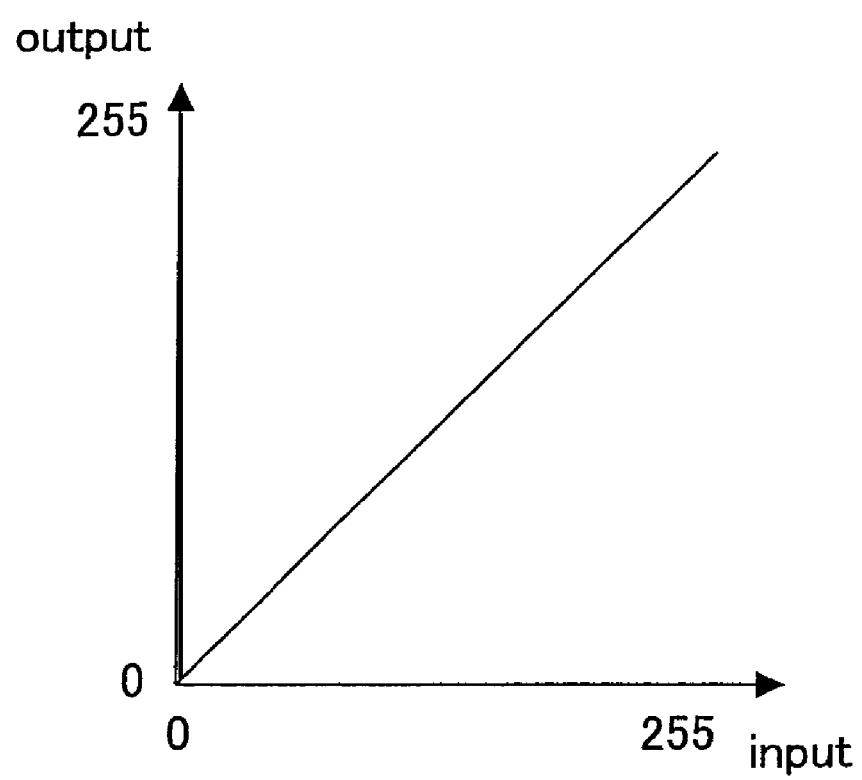
FIG. 3 is a graph in which an input signal value is identical with an output signal value
Figure 4:
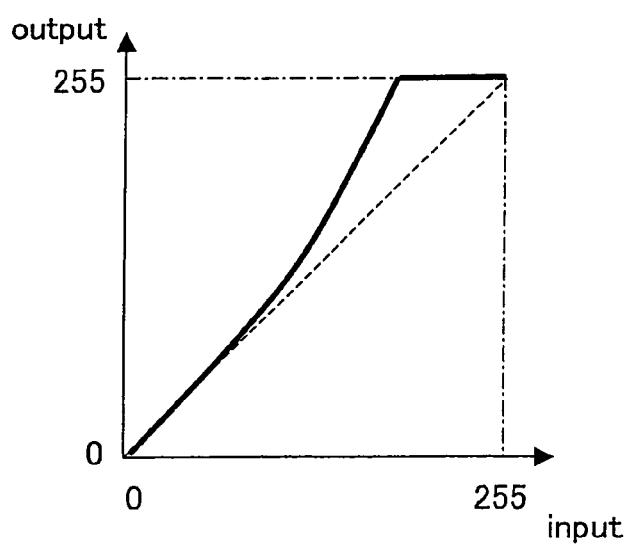
FIG. 4(a) is a graph illustrating a conversion curve used in an input tone correction section, the conversion curve being used for removal of density of a page background area.
FIG. 4(b) is a graph illustrating a conversion curve used in an input tone correction section, the conversion curve being used for generation of an image having clear contrast of density.
FIG. 4(c) is a graph illustrating a conversion curve used in an input tone correction section, the conversion curve being used for emphasizing tones.
Figure 4:
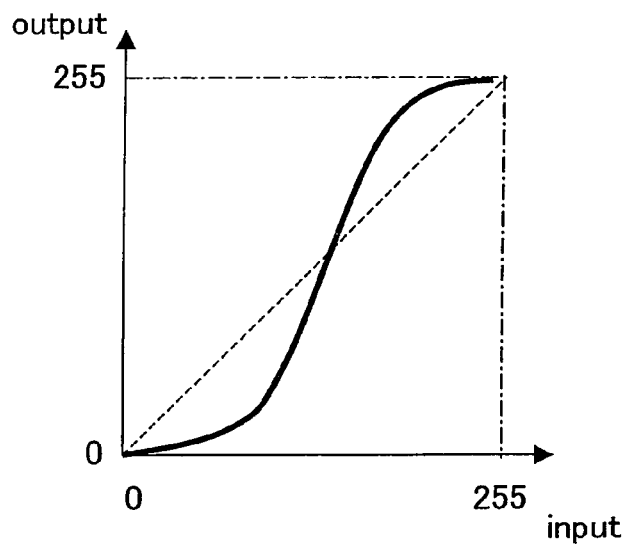
Figure 4:
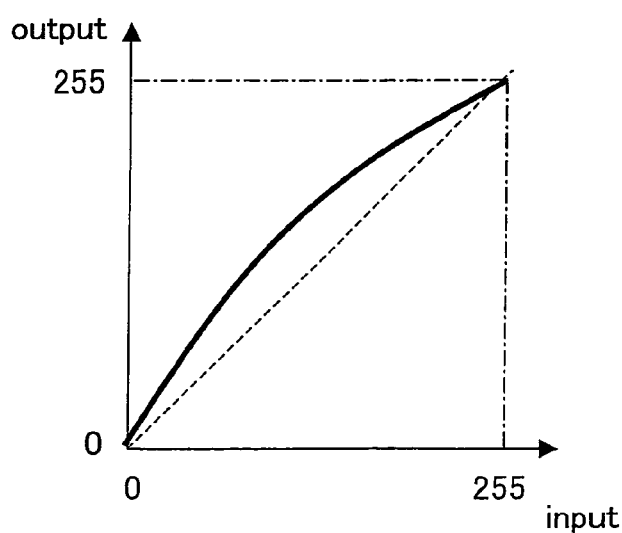

When the execute command is transmitted, the first input tone correction section 4 and the second input tone correction section 6 perform the density correction process with reference to the conversion curves in FIGS. 4(*a*) to 4(*c*). When the prohibition command is transmitted, the first input tone correction section 4 and the second input tone correction section 6 refer to a line of FIG. 3 in which an input signal value is identical with an output signal value and thus output the inputted digital RGB signals to a subsequent block without converting the signals, and accordingly do not perform the density correction process.

Namely, in a case where the document to be read by the image input apparatus 15 is the text printing document (in a case of the first processing mode), the first input tone correction section 4 performs the density correction process and the second input tone correction section 6 outputs the inputted digital RGB signals without converting the signals, thereby performing the density correction process before the segmentation process. Further, in a case where the document to be read by the image input apparatus 15 is the text photographic paper document (in a case of the second processing mode), the first input tone correction section 4 outputs the inputted digital RGB signals without converting the signals and the second input tone correction section 6 performs the density correction process, thereby performing the density correction process after the segmentation process, not before the segmentation process.

As a result, in a case where the document to be read by the image input apparatus 15 is the text printing document (in a case of the first processing mode), the segmentation process section 5 performs the segmentation process on the basis of the digital RGB signals having been subjected to the density correction process carried out by the first input tone correction section 4. Further, in a case where the document to be read by the image input apparatus 15 is the text photographic paper document (in a case of the second processing mode), the segmentation process section 5 performs the segmentation process on the basis of the digital RGB signals having not been subjected to the density correction process.

Figure 5:
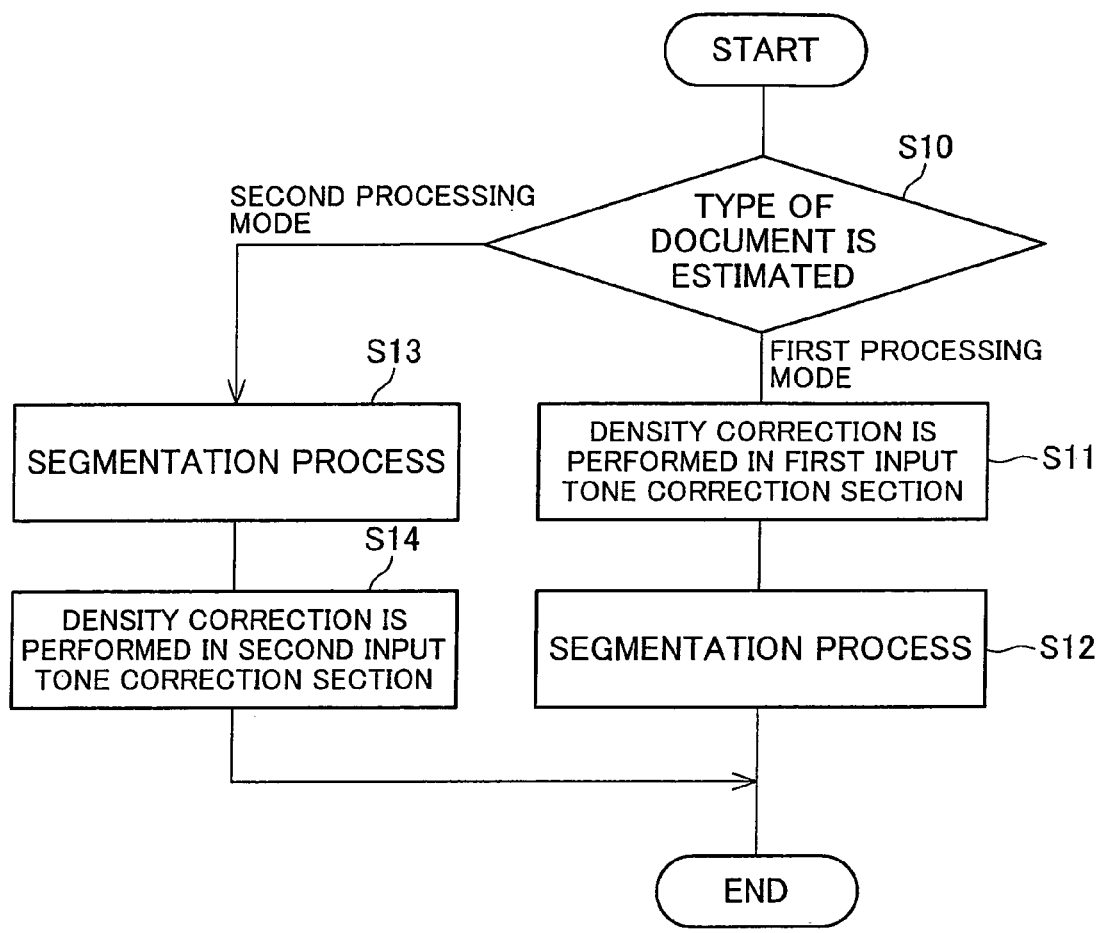
FIG. 5 is a flow chart illustrating a part of the flow of the process performed in the image processing apparatus in FIG. 1.

Next, with reference to FIG. 5, the following explains the flows of the processes in the first processing mode and the second processing mode. FIG. 5 is a flow chart illustrating a part of the flow of the process in the image processing method performed in the image processing apparatus 20.

First, when the user selects the type of the document to be read by the image input apparatus 15 by use of the operational panel 40, the document type signal indicating the type of the document is transmitted to the processing mode control section 12. Then, in S10, the processing mode control section 12 judges the type of the document to be read by the image input apparatus 15, on the basis of the transmitted document type signal.

When the processing mode control section 12 judges in S10 that the type of the document to be read by the image input apparatus 15 is the text printing document, the processing mode control section 12 selects the first processing mode. Further, when the processing mode control section 12 judges in S10 that the type of the document to be read by the image input apparatus 15 is the text photographic paper document, the processing mode control section 12 selects the second processing mode.

When the first processing mode is selected, as shown in S11 and S12, the digital RGB signals are subjected to the density correction process carried out by the first input tone correction section 4 and then are subjected to the segmentation process carried out by the segmentation process section 5. Further, when the second processing mode is selected, as shown in S13 and S14, the digital RGB signals are subjected to the segmentation process carried out by the segmentation process section 5 and then are subjected to the density correction process carried out by the second input tone correction section 6.

As described above, the image processing apparatus 20 allows for switching between (i) the first processing mode for performing the segmentation process with respect to the digital RGB signals having been subjected to the density correction process and (ii) the second processing mode for performing the segmentation process with respect to the digital RGB signals having not been subjected to the density correction process. As a result, as to an image whose accuracy in the segmentation process is higher when the segmentation process is performed after the density correction process, the segmentation process is performed with respect to the digital RGB signals having been subjected to the density correction process. As to an image whose accuracy in the segmentation process is higher when the segmentation process is performed before the density correction process, the segmentation process is performed with respect to the digital RGB signals having not been subjected to the density correction process. Therefore, it is possible to enhance accuracy in the segmentation process, compared with a conventional image processing apparatus.

Further, with the arrangement, in the second processing mode, the second input tone correction section 6 performs the density correction process with respect to the digital RGB signals having been subjected to the segmentation process. As a result, in the second processing mode in which the segmentation process is performed with respect to the digital RGB signals having not been subjected to the density correction process, it is possible to perform the density correction process. Therefore, it is possible to perform not only the segmentation process but also the density correction process both in the first and second modes.

Further, the first input tone correction section 4 outputs the digital RGB signals to the segmentation process section 5 and the second input tone correction section 6 receives the digital RGB signals from the segmentation process section 5. The processing mode control section 12 transmits an execute command of the density correction process to the first input tone correction section 4 in the first processing mode and transmits an execute command of the density correction process to the second input tone correction section 6 in the second processing mode.

As a result, in the first processing mode, the first input tone correction section 4 performs the density correction process and transmits the digital RGB signals having been subjected to the density correction process carried out by the first input tone correction section 4 to the segmentation process section 5, so that it is possible to perform the segmentation process with respect to the digital RGB signals having been subjected to the density correction process. Further, in the second processing mode, the second input tone correction section 6 receives the digital RGB signals having been subjected to the segmentation process carried out by the segmentation process section 5 and performs the density correction process with respect to the digital signals, so that it is possible to perform the density correction process also in the second processing mode in which the segmentation process is performed with respect to the digital RGB signals having not been subjected to the density correction process.

Further, with the arrangement, when document type information is inputted by the user, the processing mode control section 12 switches between the first processing mode and the second processing mode according to the document type information. As a result, as to a document image (an image read from a document) whose accuracy in the segmentation process is higher when the segmentation process is performed after the density correction process, the segmentation process is performed with respect to the digital RGB signals having been subjected to the density correction process. As to a document image whose accuracy in the segmentation process is higher when the segmentation process is performed without performing the density correction process, the segmentation process is performed with respect to the digital RGB signals having not been subjected to the density correction process.

Further, with the arrangement, the document type information indicates, as the type of a document, (i) the text and photographic-picture document (first document) which includes a continuous tone image area or (ii) the text printing document (second document) which does not include the continuous tone image area. As such, when the inputted document type signal indicates the text and photographic-picture document, the processing mode control section 12 switches to the second processing mode. When the inputted document type signal indicates the text printing document, the processing mode control section 12 switches to the first processing mode. Therefore, as to an image read from the text and photographic-picture document including the continuous tone image area, the segmentation process is performed with respect to the digital RGB signals having not been subjected to the density correction process. As a result, even when an edge portion adjacent to a low density area exists in the continuous tone image area, the segmentation process is performed while density in the low density area is maintained, so that the edge portion is less likely to be regarded as "a high density part on a white page background" in the segmentation process, and accordingly it is possible to prevent the edge portion from being wrongly detected as a text area.

Further, as to an image read from the text printing document which does not include the continuous tone image area, the segmentation process is performed with respect to the digital RGB signals having been subjected to the density correction process. As a result, when a text is included in the text printing document, it is possible to drop density of a page background adjacent to the text and accordingly the text is more likely to be regarded as "a high density part on a white page background", so that it is possible to detect a text area with high accuracy.

Figure 6:
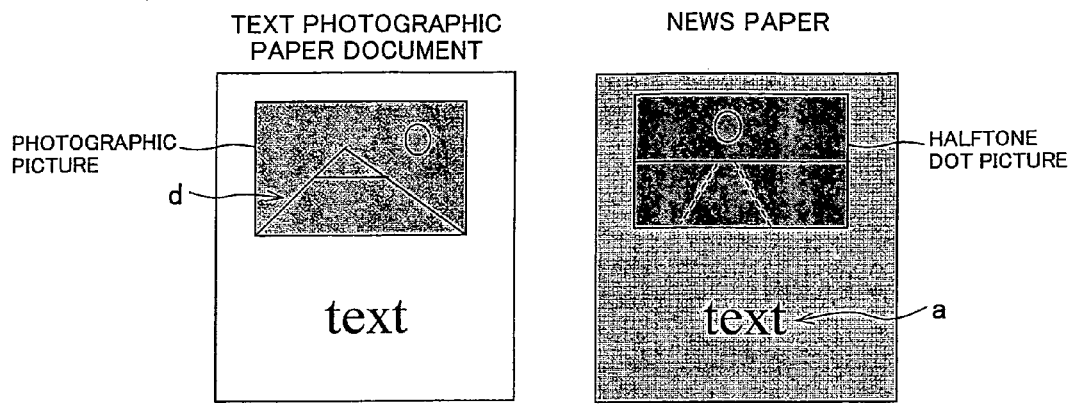
FIG. 6(a) schematically illustrates an image to be inputted to a segmentation process section in a conventional image processing apparatus which performs a density correction process not before a segmentation process but after the segmentation process.
FIG. 6(b) schematically illustrates an image to be inputted to a segmentation process section in a conventional image processing apparatus which performs a density correction process before a segmentation process.
FIG. 6(c) schematically illustrates an image to be inputted to a segmentation process section according to the present embodiment.
Figure 6:
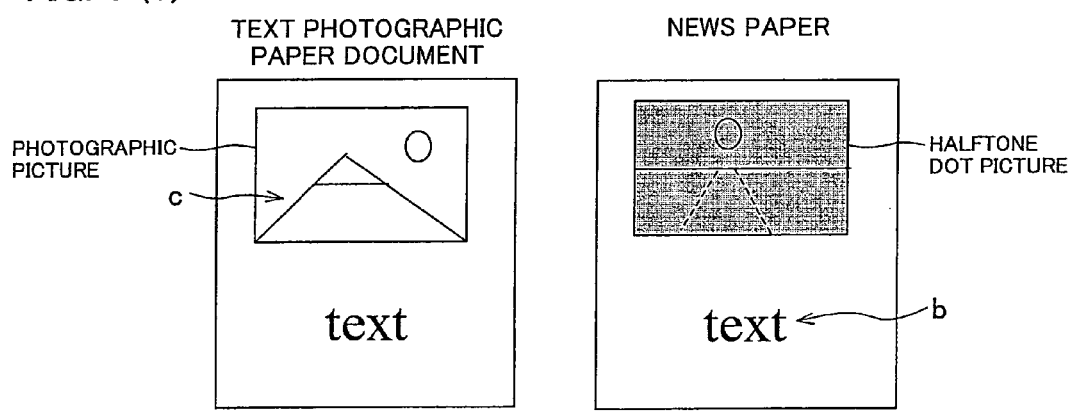
Figure 6:
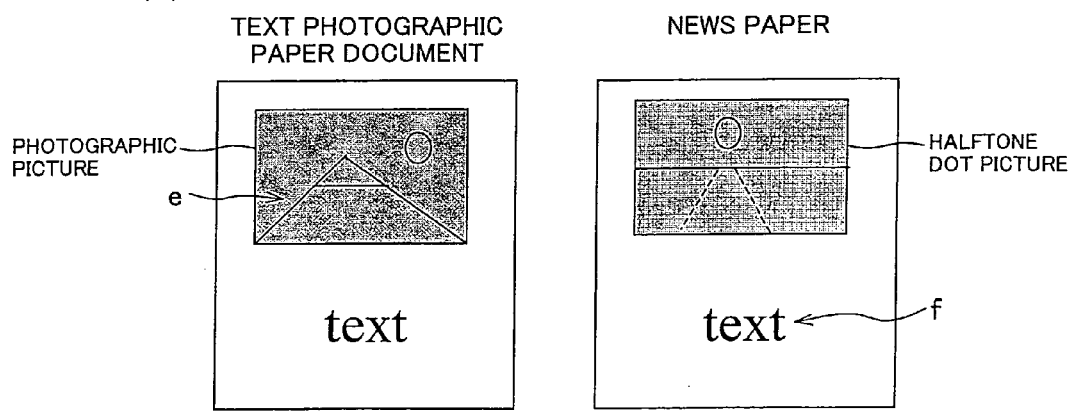

FIG. 6 schematically illustrates the effects described above. FIG. 6(a) schematically illustrates an image to be inputted to a segmentation process section in a conventional image processing apparatus which does not perform a page background density removal process (corresponding to the density correction process based on the conversion curve in FIG. 4(a)) before a segmentation process regardless of the type of a document. FIG. 6(b) schematically illustrates an image to be inputted to a segmentation process section in a conventional image processing apparatus which performs a page background density removal process before a segmentation process regardless of the type of a document. FIG. 6(c) schematically illustrates an image to be inputted to the segmentation process section 5 according to the present embodiment. Note that, each of FIGS. 6(a) to 6(c) illustrates: an image read out from a text photographic paper document in which a text area and a photographic-picture area are mixed with each other; and an image read out from a text printing document (a news paper in the figures) including a halftone dot area and a text area.

Generally, in the segmentation process, on the premise that "a text exists generally on a white page background", when the maximum signal level is larger than a predetermined value in a block having M×N pixels and centering a current pixel ($D_{max}$>PA, namely, the minimum density is not more than a predetermined reference), the current pixel is identified as a text area (see the condition (5)). Therefore, in a case where a text printed on a page background having certain density such as news papers is detected, when the segmentation process is performed after the page background density removal process, the segmentation process is performed after the maximum signal level is increased, so that it is easy to detect a text.

Here, in a case of the conventional image processing apparatus which does not perform the page background density removal process before the segmentation process, as illustrated in FIG. 6(a), the segmentation process is performed with respect to the image read out from the news papers while the density of the page background area is maintained. As a result, in the text area in the image (reference sign a), segmentation is performed without increasing the maximum signal level and accordingly it is difficult to satisfy the condition $D_{max}$>PA, so that the text area may not be detected as a text area.

On the other hand, in a case of the conventional image processing apparatus in which the page background density removal process is performed before the segmentation process, as illustrated in FIG. 6(b), the segmentation process is performed with respect to the image read out from the news papers, after the density of the page background area is removed and accordingly the density of the page background area drops. As a result, in the text area (reference sign b), segmentation is performed while the maximum signal level is increased by dropping the density of the surrounding page background area, and accordingly the condition $D_{max}$>PA is more likely to be satisfied, so that it is easy to detect the text area as a text in the segmentation process.

However, in a case of the conventional image processing apparatus in which the page background density removal process is performed before the segmentation process, as illustrated in FIG. 6(b), density of a low density area (reference sign c) adjacent to the edge portion of the photographic-picture may be removed from the image, read out from the text photographic paper document, before the segmentation process. At that time, segmentation is performed with respect to the edge portion while the maximum signal level is increased due to drop of the density of the adjacent low density area, so that the condition $D_{max}$>PA is more likely to be satisfied, which raises a problem that the edge portion is wrongly detected as a text area.

On the other hand, in a case where the page background density removal process is not performed with respect to the image read out from the text photographic paper document before the segmentation process, as illustrated in FIG. 6(a), the segmentation process is performed while the density of the low density area (reference sign d) adjacent to the edge portion of the photographic-picture is maintained. As a result, segmentation is performed with respect to the edge portion without increasing the maximum signal level, so that the condition $D_{max}$>PA is less likely to be satisfied and accordingly the edge portion is less likely to be wrongly detected as a text area. However, in a case where the page background density removal process is not performed before the segmentation process, as described above, it may be difficult to detect a text on the page background area having certain density.

Namely, in a case where the page background density removal process is performed before the segmentation process, it is easy to detect a text on the page background area having certain density, while the edge portion in the photographic-picture is likely to be wrongly detected as a text. In a case where the page background density removal process is not performed before the segmentation process, it is possible to prevent the edge portion in the photographic-picture from being wrongly detected, while it is difficult to detect a text on the page background area having certain density.

In terms of this point, the present embodiment changes the order of the segmentation process and the density correction process according to the type of the document read out by the image input apparatus 15. To be specific, as to the image read out from the text photographic paper document, the segmentation process is performed with respect to the digital RGB signals having not been subjected to the density correction process. As to the image read out from the text printing document, the segmentation process is performed with respect to the digital RGB signals having been subjected to the density correction process.

Accordingly, as illustrated in FIG. 6(c), as to the image read out from the text printing document (news papers), the segmentation process is performed after the density of the page background around the text area (reference sign f) is removed, so that the text area is likely to satisfy the condition $D_{max}$>PA, which allows for detection of the text area with high accuracy. As to the image read out from the text photographic paper document, the density correction process is not performed before the segmentation process and accordingly the segmentation process is performed while the density of the low density area adjacent to the edge portion of the photographic-picture is maintained, so that the edge portion is hardly likely to satisfy the condition $D_{max}$>PA, which allows for preventing the edge portion (reference sign e) from being wrongly detected as a text area.

Note that, in the image processing apparatus 20, the processing mode control section 12 switches between the first processing mode and the second processing mode according to the document type signal inputted by the user. However, the signal acting as a trigger for switching is not limited to the document type signal. For example, the image processing apparatus 20 may be arranged so that: when the user selects either the first processing mode or the second processing mode by use of the operational panel 40, a mode signal indicative of the type of the selected mode is transmitted from the operational panel 40 to the processing mode control section 12 and the processing mode control section 12 switches between the first processing mode and the second processing mode according to the mode signal.

Further, in the foregoing image processing apparatus 20, the image to be processed is read out from a document. However, the image is not limited to an image read out from a document. For example, the image may be an image captured by a digital camera. This is because whether to process such image by use of the first processing mode or the second processing mode depends on a captured image. Therefore, when the user causes the image processing apparatus 20 to process the captured image, the user should switch, by use of the operational panel, between the first processing mode and the second processing mode according to the captured image.

Modification Example

In the image processing apparatus 20 illustrated in FIG. 1, when the user selects, by use of the operational panel 40, the type of a document to be read by the image input apparatus 15, a document type signal indicative of the type of the document is transmitted to the processing mode control section 12. Then, the processing mode control section 12 selects either the first processing mode or the second processing mode according to the transmitted document type signal.

However, the present invention may be applied to an image processing apparatus which has a function for automatically discriminating the type of a document and outputting the document type signal. At that time, it is possible to eliminate the necessity for the user to select the type of the document by use of the operational panel. The following explains an embodiment in which the present invention is applied to such an image processing apparatus.

Figure 7:
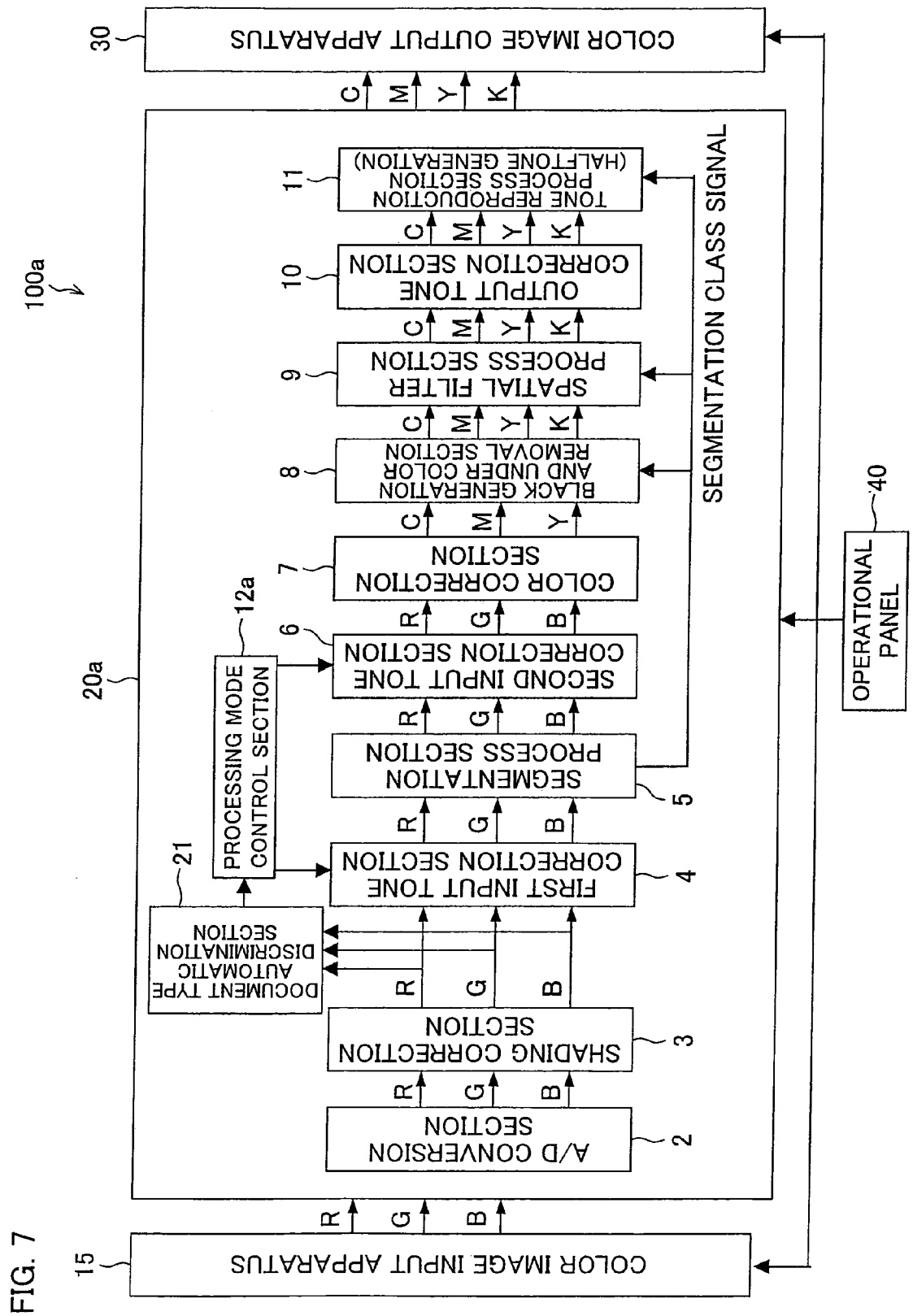
FIG. 7 is a block diagram illustrating a whole structure of an image forming apparatus including an image processing apparatus having a function for automatically identifying the type of a document.

FIG. 7 is a block diagram illustrating the whole structure of an image forming apparatus 100a including an image processing apparatus having a function for automatically judging the type of a document.

An image processing apparatus 20a included in the image forming apparatus 100a includes a document type automatic discrimination section 21 as well as the sections included in the image processing apparatus 20 illustrated in FIG. 1.

The document type automatic discrimination section 21 estimates the type of a document to be read out by the image input apparatus 15, on the basis of digital RGB signals outputted from the shading correction section 3, and transmits a document type signal indicative of the result of judgment to a processing mode control section 12a. Namely, the document type signal is information indicating the type of the document from which the digital RGB signals have been read out.

Note that, the kinds of documents to be estimated by the document type automatic discrimination section (document type discrimination means) 21 include: a text document; a printed-picture document (a halftone dot picture document); a text/printed-picture document in which a text and printed-pictures are mixed with one another; and a photographic paper document which at least partially includes a photographic-picture area.

The processing mode control section 12a selects the first processing mode when the document type signal transmitted from the document type automatic discrimination section 21 is indicative of a document other than the photographic paper document, and the processing mode control section 12a selects the second processing mode when the document type signal is indicative of the photographic paper document.

Note that, an example of the document type discrimination method in the document type automatic discrimination section 21 is a well known method disclosed in Japanese Unexamined Patent Publication No. 232708/2002, and the method is not particularly limited. Simple explanation of the method disclosed in Japanese Unexamined Patent Publication No. 232708/2002 is given as the following steps (1) to (7).

(1) The minimum density value and the maximum density value in a block having n×m pixels including a current pixel are calculated.
(2) The maximum density difference is calculated by using the calculated minimum density value and the maximum density value.
(3) Total density busyness which is the total of absolute values of density differences in adjacent pixels is calculated.
(4) The calculated maximum density difference is compared with the maximum density difference threshold value, and the calculated total density busyness is compared with the total density busyness threshold value. When a condition that the maximum density difference<the maximum density difference threshold value and the total density busyness<the total density busyness threshold value is satisfied, the current pixel is judged to be a page background/photographic paper area. When the above condition is not satisfied, the current pixel is judged to be a text/halftone dot area.
(5) As to the pixel having been judged to be the page background/photographic paper area, the maximum density difference is compared with a page background/photographic paper judgment threshold value. When a condition that the maximum density difference<the page background/photographic paper judgment threshold value is satisfied, the pixel is judged to be a page background area. When the above condition is not satisfied, the pixel is judged to be a halftone dot area.
(6) As to a pixel having been judged to be a page background/halftone dot area, the total density busyness is compared with a value obtained by multiplying the maximum density difference by a text/halftone dot judgment threshold value. When a condition that the total density busyness<the value obtained by multiplying the maximum density difference by the text/halftone dot judgment threshold value is satisfied, the pixel is judged to be a text area. When the above condition is not satisfied, the pixel is judged to be a halftone dot area.
(7) The number of judged pixels is counted and compared with threshold values which are predetermined with respect to a page background area, a photographic paper area, a halftone dot area and a text area, respectively, so that the type of the document as a whole is estimated. For example, when both of the ratio of the text area and the ratio of the halftone dot area are not less than the predetermined values, the document is estimated as a text/printed-picture document in which a text area and a halftone dot area are mixed with each other. The following explains examples of the threshold values predetermined with respect to the page background area, the photographic paper area, the halftone dot area and the text area. Assuming that detection accuracy is higher in the order of a photographic-picture, halftone dots, and a text, the threshold values should be set so that: when the ratio of the text area is 30% of the number of all pixels, the document is estimated as the text document; when the ratio of the halftone dot area is 20% of the number of all pixels, the document is estimated as the printed-picture document; and when the ratio of the photographic-picture area is 10% of the number of all pixels, the document is estimated as the photographic paper document.

Note that, in order to estimate the type of the document, the document may be pre-scanned or the document may be estimated by using image data once stored in storage means such as a hard disc.

Figure 8:
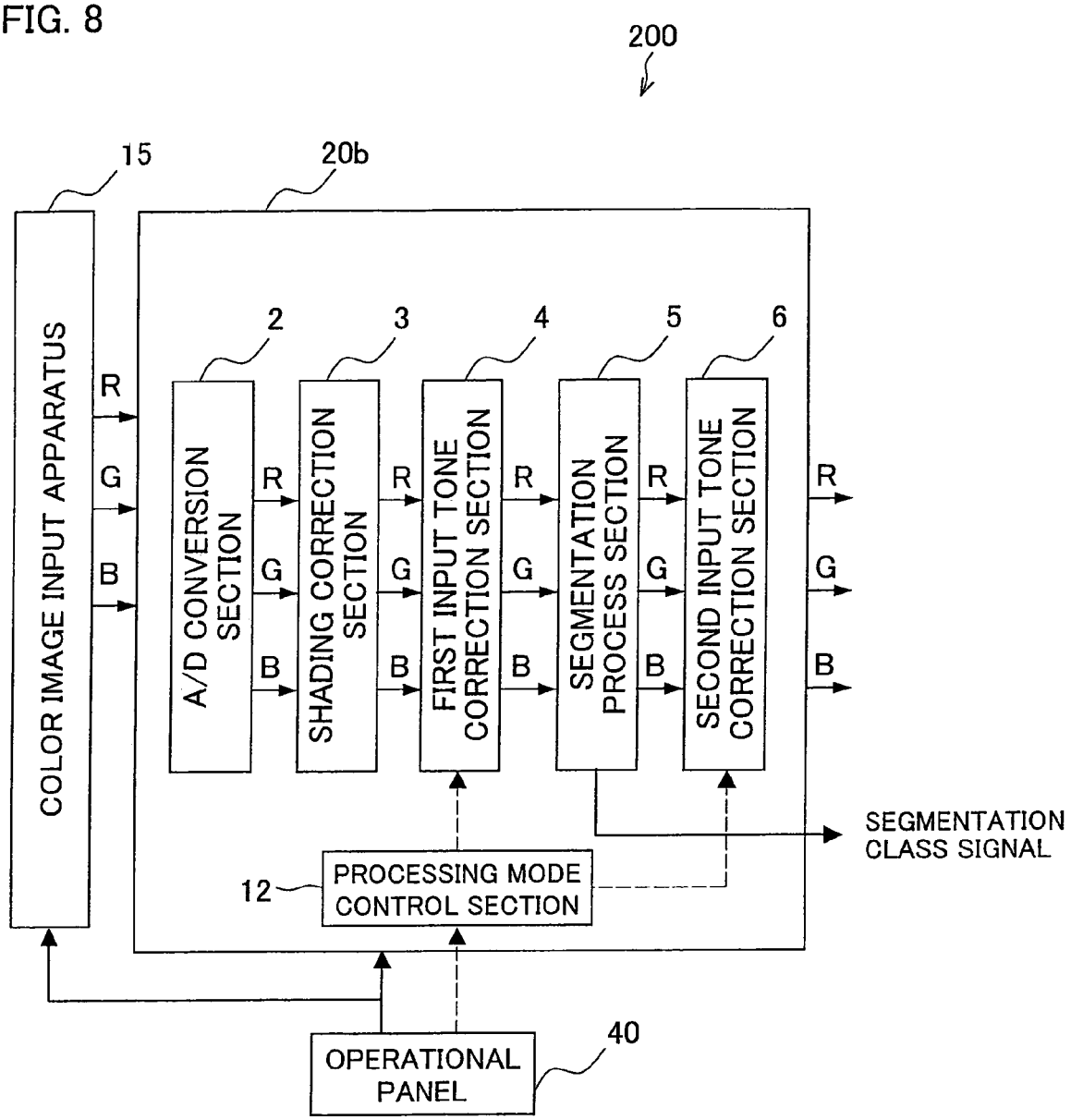
FIG. 8 is a block diagram illustrating a whole structure of an image reading apparatus including an image processing apparatus according to an embodiment of the present invention.

Further, the image processing apparatus as described above, which is capable of switching between the first processing mode and the second processing mode, may be included in an image reading apparatus such as a flat bed scanner as well as the image forming apparatuses 100 and 100a. FIG. 8 is a block diagram illustrating a whole structure of the image reading apparatus.

As illustrated in FIG. 8, an image reading apparatus 200 includes the image input apparatus 15, an image processing apparatus 20b, and the operational panel 40. Here, just like the image processing apparatus 20 illustrated in FIG. 1, the image processing apparatus 20b illustrated in FIG. 8 includes the A/D conversion section 2, the shading correction section 3, the first input tone correction section 4, the segmentation process section 5, the second input tone correction section 6 and the processing mode control section 12. Note that, in the image processing apparatus 20b illustrated in FIG. 8, digital RGB signals outputted from the second input tone correction section 6 and a segmentation class signal outputted from the segmentation process section 5 are transmitted to an external device (e.g., a PC and a printer) via wired lines or wireless.

Figure 9:
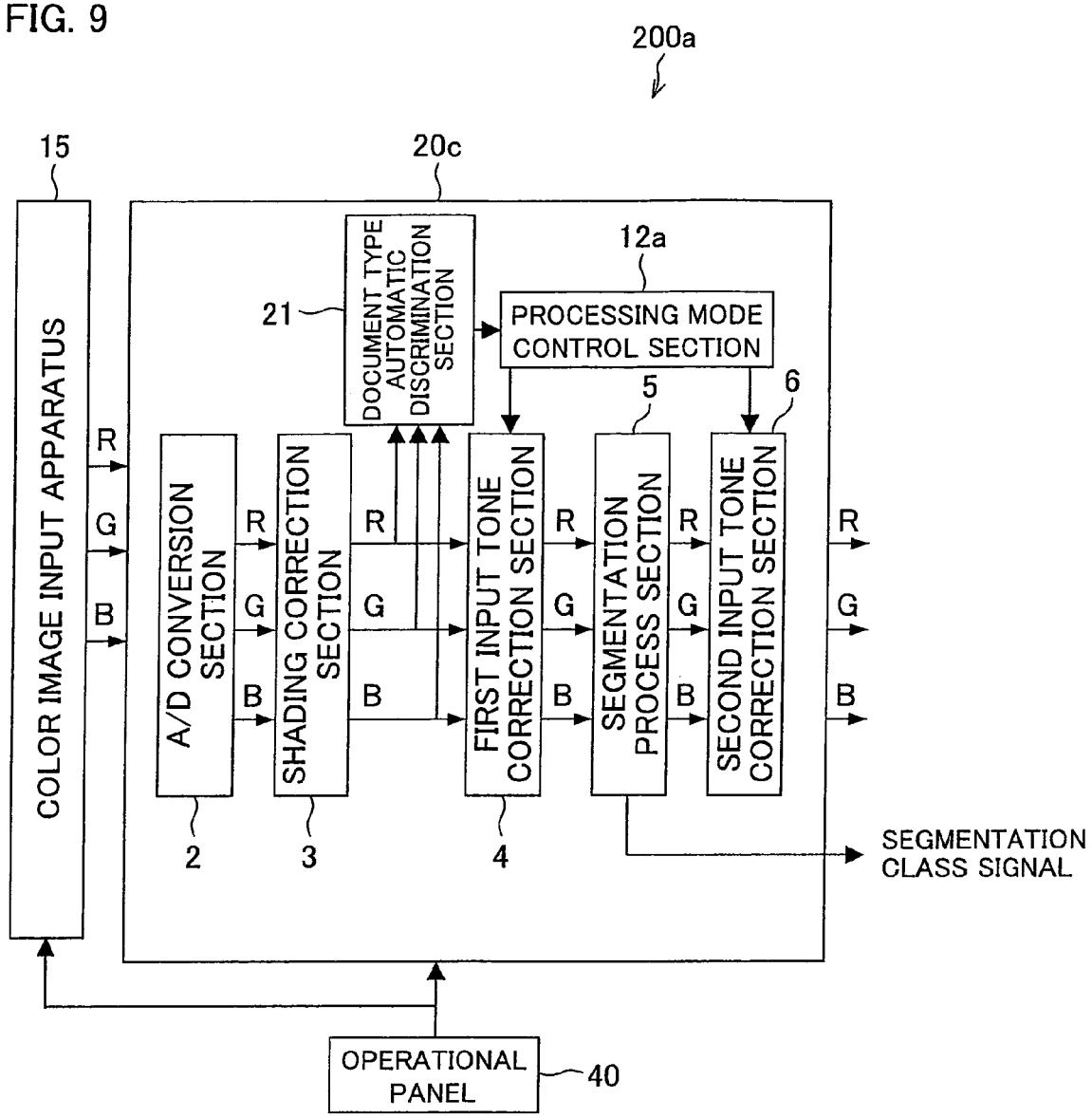
FIG. 9 is a block diagram illustrating a whole structure of an image reading apparatus including an image processing apparatus having a function for automatically identifying the type of a document.

Further, the present invention may be arranged so that the image reading apparatus includes an image processing apparatus which switches between the first processing mode and the second processing mode according to the result of estimation carried out by the document type automatic discrimination section 21. FIG. 9 is a block diagram illustrating a whole structure of the image reading apparatus.

As illustrated in FIG. 9, an image reading apparatus 200a includes the image input apparatus 15, an image processing apparatus 20c, and the operational panel 40. Here, just like the image processing apparatus 20a illustrated in FIG. 7, the image processing apparatus 20c illustrated in FIG. 9 includes the A/D conversion section 2, the shading correction section 3, the first input tone correction section 4, the segmentation process section 5, the second input tone correction section 6, the document type automatic discrimination section 21, and the processing mode control section 12a. Note that, in the image processing apparatus 20c illustrated in FIG. 9, digital RGB signals outputted from the second input tone correction section 6 and a segmentation class signal outputted from the segmentation process section 5 are transmitted to an external device (e.g., a PC and a printer) via wired lines or wireless.

Figure 10:
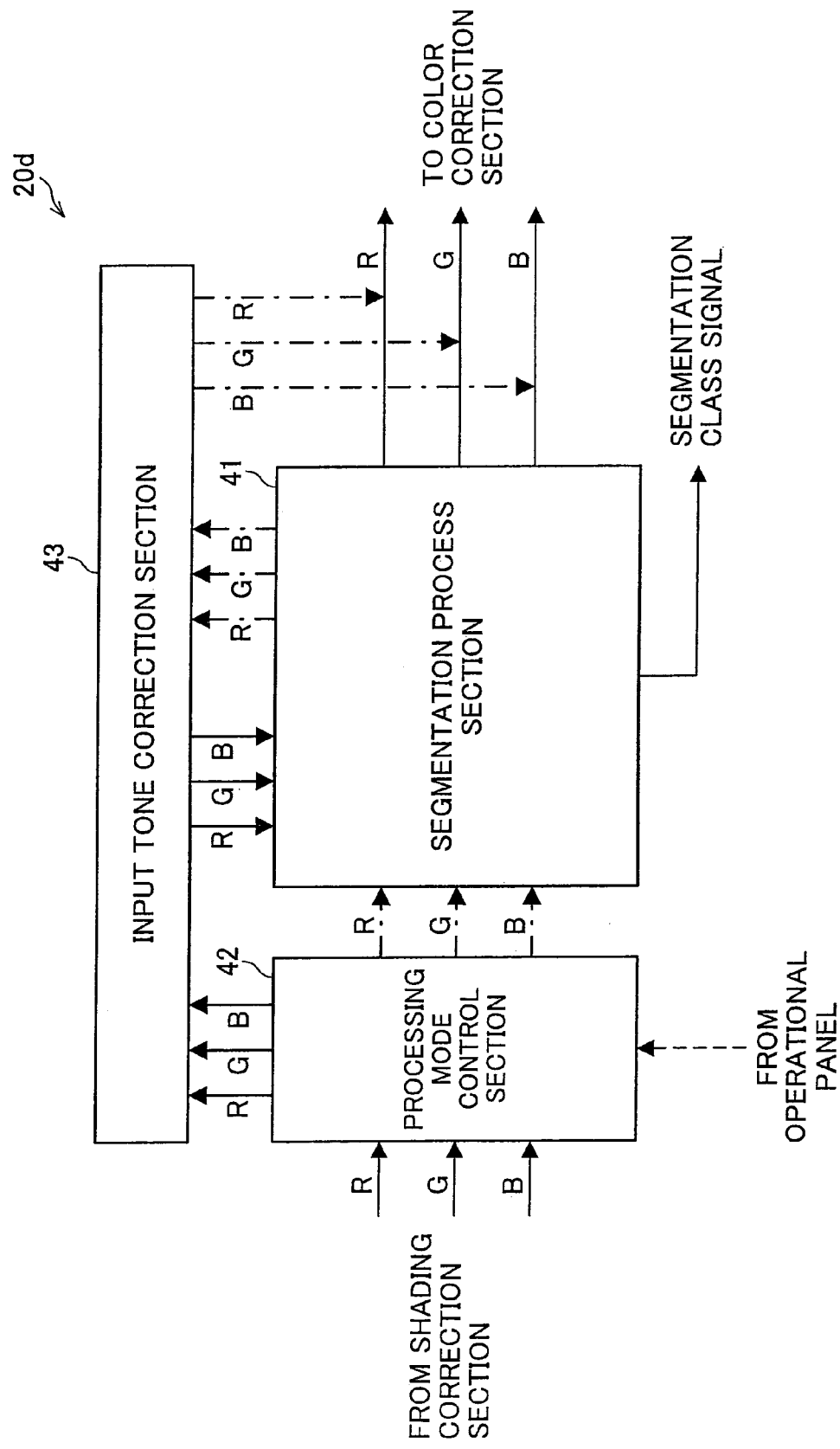
FIG. 10 is a block diagram illustrating a whole structure of an image processing apparatus including only one input tone correction section.

Further, each of the image processing apparatuses 20, 20a, 20b, and 20c is arranged so that the first input tone correction section 4 is provided in a previous stage of the segmentation process section 5 and the second input tone correction section 6 is provided in a subsequent stage of the segmentation process section 5. However, the input tone correction sections are not necessarily provided as many as two. In a case where only a single input tone correction section is provided, it is also possible to provide an image processing apparatus capable of switching between the first processing mode and the second processing mode. FIG. 10 is a block diagram illustrating a structure of an image processing apparatus including only one input tone correction section.

As illustrated in FIG. 10, an image processing apparatus 20d includes an input tone correction section (density correction means) 43, a segmentation process section (segmentation process means) 41, and a processing mode control section (processing mode control means) 42. Note that, though not shown in FIG. 10, just like the image processing apparatus 20 illustrated in FIG. 1, the image processing apparatus 20d includes an A/D conversion section, a shading correction section, a color correction section, a black generation and under color removal section, a spatial filter process section, an output tone correction section, and a tone reproduction process section. The image processing apparatus 20d is connected with an operational panel.

Just like the first input tone correction section 4 and the second input tone correction section 6, the input tone correction section 43 performs the density correction process with respect to digital RGB signals. Just like the segmentation process section 5, the segmentation process section 41 performs the segmentation process on the basis of the digital RGB signals. The processing mode control section 42 switches between the first processing mode and the second processing mode according to the document type signal transmitted from the operational panel (not shown).

Further, in the image processing apparatus 20d having the arrangement illustrated in FIG. 10, the processing mode control section 42 receives the digital RGB signals form the shading correction section (not shown).

Here, when the first processing mode is selected, the processing mode control section 42 transmits the digital RGB signals to the input tone correction section 43. When the digital RGB signals are transmitted from the processing mode control section 42, the input tone correction section 43 performs the density correction process with respect to the digital RGB signals and transmits the digital RGB signals having been subjected to the density correction process to the segmentation process section 41. When the digital RGB signals are transmitted from the input tone correction section 43, the segmentation process section 41 performs the segmentation process on the basis of the digital RGB signals and transmits the digital RGB signals to the color correction section (not shown).

Namely, in the image processing apparatus 20d having the arrangement illustrated in FIG. 10, in the first processing mode, the digital RGB signals are serially transmitted to the processing mode control section 42, the input tone correction section 43, and the segmentation process section 41. The digital RGB signals having been subjected to density correction are inputted to the segmentation process section 41. Therefore, in the first processing mode, the segmentation process section 41 performs the segmentation process with respect to the digital RGB signals having been subjected to the density correction process.

Further, when the second processing mode is selected, the processing mode control section 42 transmits the digital RGB signals having been inputted from the shading correction section to the segmentation process section 41. When the digital RGB signals are transmitted from the processing mode control section 42, the segmentation process section 41 performs the segmentation process with respect to the digital RGB signals and transmits the digital RGB signals to the input tone correction section 43. When the digital RGB signals are transmitted from the segmentation process section 41, the input tone correction section 43 performs the density correction process with respect to the digital RGB signals and transmits the digital RGB signals having been subjected to the density correction process to the color correction section (not shown).

Namely, according to the image processing apparatus 20d having the arrangement illustrated in FIG. 10, in the second processing mode, the digital RGB signals are serially transmitted to the processing mode control section 42, the segmentation process section 41, and the input tone correction section 43. The digital RGB signals having not been subjected to density correction carried out by the input tone correction section 43 are inputted to the segmentation process section 41. Therefore, in the second processing mode, the segmentation process section 41 performs the segmentation process with respect to the digital RGB signals having not been subjected to the density correction process.

Further, in the above embodiments, the text printing document indicates a document which does not include a continuous tone image area such as a photographic-picture area or the like. "A document which does not include a continuous tone image area" or "a text printing document" indicates a document in which the ratio of the number of pixels judged to be the halftone dot area to the number of whole pixels in the document is not less than a predetermined amount, or a document in which the ratio of the number of pixels judged to be the continuous tone image area to the number of whole pixels in the document is not more than a predetermined amount.

Further, in the above embodiments, the text photographic paper document indicates a document at least partially including a continuous tone image area such as a photographic-picture area or the like. "A document at least partially including a continuous tone image area" or "text photographic paper document" indicates a document in which the ratio of the number of pixels judged to be the continuous tone image area to the number of whole pixels in the document is not less than a predetermined amount, or a document in which the ratio of the number of pixels judged to be the halftone dot area to the number of whole pixels in the document is not more than a predetermined amount.

Further, the image processing apparatuses 20, 20a, 20b, and 20c illustrated in FIGS. 1, 7, 8, and 9, respectively, are not necessarily connected to the image input apparatus 15 and the image output apparatus 30 via wired lines or wireless, and the image processing apparatus may be provided without being connected to other devices. At that time, the image processing apparatus should perform image processing with respect to image data (digital RGB signals) read out from a removable storage medium and write the processed image data in the removable storage medium.

Incidentally, functions of each section of the image processing apparatus in the embodiments can be realized in such a manner that a central processing unit such as a processor executes a program stored in a storage medium such as a ROM or RAM and controls various peripheral circuits. Therefore, a computer including the central processing circuit and the peripheral circuits read out the program from the storage medium and execute the program, so that functions and processes of the image processing apparatus according to the present embodiment can be realized. Further, the program is stored in the removable storage medium, so that it is possible to realize the functions and the processes on any computer.

The storage medium is, for example, tapes such as a magnetic tape and a cassette tape, or discs such as magnetic discs (e.g. a floppy disc (registered trademark) and a hard disc), and optical discs (e.g. a CD-ROM, an MO, an MD, a DVD, and a CD-R), cards such as an IC card (including a memory card) and an optical card, or semiconductor memories such as a mask ROM, an EPROM, an EEPROM, and a flash ROM.

Further, a printer driver having the program may be provided in a computer or a printer, or a scanner driver having the program may be provided in a scanner.

Further, the present invention may be arranged so that the image processing apparatus according to the present embodiment is capable of being connected with a communication network and the program is supplied to the image processing apparatus via the communication network. The communication network is not particularly limited. Examples of the communication network include the Internet, an intranet, an extranet, a LAN, an ISDN, a VAN, a CATV communication network, a virtual private network, a telephone line network, a mobile phone communication network, and a satellite communication network. Further, a transmission medium that constitutes the communication network is not particularly limited. Examples of the transmission medium include (i) wired lines such as IEEE 1394, a USB, a power line carrier, a cable TV line, a telephone line, and an ADSL line and (ii) wireless such as an infrared ray (e.g. IrDA or remote controller), Bluetooth (registered trademark), 802.11 wireless, HDR, a portable phone network, a satellite line, and a terrestrial wave digital network. Note that the present invention can be realized by using a computer data signal embedded in a carrier wave, which is the program that is electrically transmitted.

Further, the image forming apparatus according to the present embodiment may be an image forming system including: an image reading apparatus such as a flat bed scanner, a film scanner, and a digital camera; a computer which performs image processing by use of the program which is downloaded; an image display device, such as a display (LCD or CRT), for displaying the result of processing carried out by the computer; and a printer for outputting an image onto a paper on the basis of image data processed by the computer. Further, the image forming apparatus may be provided with a network card or a modem acting as communication means with which the image forming apparatus is connected to a server via a network.

The present invention is applicable to a color copying machine, a color printer, a monochrome copying machine, a monochrome printer, a scanner, a personal computer and the like, each of which has a function for processing images.

As described above, the image processing apparatus according to the present invention includes: segmentation process means for performing a segmentation process with respect to image data; density correction means for performing a density correction process with respect to the image data by referring to density correcting data which indicates a relation between density before correction and density after correction; and processing mode control means for switching between (i) a first processing mode in which the segmentation process is performed with respect to the image data having been subjected to the density correction process and (ii) a second processing mode in which the segmentation process is performed with respect to image data having not been subjected to the density correction process.

Further, it is preferable to arrange the image processing apparatus so that: in the second processing mode, the density correction means performs the density correction process with respect to the image data having been subjected to the segmentation process.

In the image processing apparatus, it is necessary to perform the density correction process as well as the segmentation process. With the above arrangement, it is possible to perform the density correction process also in the second processing mode in which the segmentation process is performed with respect to image data having not been subjected to the density correction process. Therefore, it is possible to perform not only the segmentation process but also the density correction process in both modes.

The image processing apparatus according to the present invention may be arranged so that: the density correction means includes (a) first density correction means for outputting the image data to the segmentation process means and (b) second density correction means for receiving the image data from the segmentation process means, and the processing mode control means instructs the first density correction means to carry out the density correction process in the first processing mode and the processing mode control means instructs the second density correction means to carry out the density correction process in the second processing mode.

With the arrangement, in the first processing mode, the first density correction means performs the density correction process with respect to image data, and the image data having been subjected to the density correction process carried out by the first density correction means is outputted from the first density correction means to the segmentation process means, and the image data having been subjected to the density correction process is subjected to the segmentation process.

Further, in the second processing mode, the second density correction means receives image data from the segmentation process means and performs the density correction process with respect to the image data. Therefore, it is possible to perform the density correction process also in the second processing mode in which the segmentation process is performed with respect to the image data having not been subjected to the density correction process.

Further, the image processing apparatus according to the present invention may be arranged so that: the image data is read out from a document, there is provided document type discrimination means for estimating a type of the document by use of the image data and for outputting a document type signal corresponding to identification information for indicating the type of the document, and the processing mode control means switches between the first processing mode and the second processing mode according to the document type signal. Further, the image processing apparatus may be arranged so that: the image data is read out from a document, and when document type information indicative of a type of the document is inputted by a user, the processing mode control means switches between the first processing mode and the second processing mode according to the document type information.

With the arrangement, the first processing mode and the second processing mode are switched according to the type of the document. As a result, as to a document image (an image read out from a document) whose accuracy in the segmentation process is higher when the segmentation process is performed after the density correction process, the segmentation process is performed with respect to image data having been subject to the density correction process. As to a document image whose accuracy in the segmentation process is higher when the segmentation process is performed without performing the density correction process, the segmentation process is performed with respect to image data having not been subject to the density correction process.

Further, it is preferable to arrange the image processing apparatus according to the present invention so that: the document type information indicates, as the type of the document, (i) a first document which at least partially includes a continuous tone image area or (ii) a second document which does not include the continuous tone image area, and when the document type information is indicative of the first document, the processing mode control means switches to the second processing mode, and when the document type information is indicative of the second document, the processing mode control means switches to the first processing mode.

With the arrangement, as to an image read out from the first document which includes the continuous tone image area, the segmentation process is performed with respect to the image data having not been subjected to the density correction process. As a result, even when there is an edge portion adjacent to a low density area in the continuous tone image area, the segmentation process is performed while density in the low density area is maintained. Therefore, the edge portion is not regarded as a high density part existing on a white page background area, so that it is possible to prevent the edge portion from being wrongly detected as a text area.

Note that, the continuous tone image area is not an area constituted of halftone dots but an area whose tones are continuously made with silver particles or dye particles. To be specific, the continuous tone image area indicates an area made of a photographic-picture, an image area printed by a dye sublimation printer or a thermal transfer printer, and etc.

Further, as to an image read out from the second document which does not include the continuous tone image area, the segmentation process is performed with respect to the image data having been subjected to the density correction process. As a result, in a case where a text is included in the second document, by reducing density of a page background area around the text, the text surrounded by the page background area is more likely to be regarded as "a high density part on a white page background", so that it is possible to detect the text areas with high accuracy. Therefore, it is preferable to arrange the image processing apparatus according to the present invention so that the density correction process is a process in which density of a page background area included in an image corresponding to the image data is reduced.

Further, the image processing method according to the present invention includes the steps of: performing a segmentation process with respect to image data; and performing a density correction process with respect to the image data by referring to density correcting data which indicates a relation between density before correction and density after correction, said method switching between (i) a first processing mode in which the segmentation process is performed with respect to the image data having been subjected to the density correction process and (ii) a second processing mode in which the segmentation process is performed with respect to image data having not been subjected to the density correction process. With the method, it is possible to realize substantially the same effect as the above effect.

Further, the image processing apparatus according to the present invention may be included in an image forming apparatus or an image reading apparatus. With the arrangement, it is possible to realize substantially the same effect as the above effect.

Further, the image processing apparatus may be realized by use of a computer. At that time, (i) an image processing program for causing the computer to function as each of the means and (ii) a computer-readable storage medium for storing the program are also within the scope of the present invention.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus, comprising:
segmentation process means for performing a segmentation process with respect to image data;
density correction means for performing a density correction process with respect to the image data by referring to density correcting data which indicates a relation between density before correction and density after correction; the density correction process being a process in which density of a page background area included in an image corresponding to the image data is reduced; and
processing mode control means for switching between (i) a first processing mode in which the segmentation process is performed with respect to the image data having been subjected to the density correction process and (ii) a second processing mode in which the segmentation process is performed with respect to image data having not been subjected to the density correction process,
wherein;
the image data is read out from a document,
said document is a first document type which at least partially includes a continuous tone image area or a second document type which does not include a continuous tone image area, and the continuous tone image area is not an area constituted of halftone dots but an area whose tones are continuously made with silver particles or dye particles, and when receiving document type information indicating that the document from which the image data is being read out is of said first document type, the processing mode control means switches to said second processing mode to prevent an edge portion of the continuous tone image area from being wrongly detected as a text area, and when receiving document type information indicating that the document from which the image data being read out is of said second document type, the processing control means switches to said first processing mode to detect a text area with high accuracy.

2. The image processing apparatus as set forth in claim 1, wherein:

in the second processing mode, the density correction means performs the density correction process with respect to the image data having been subjected to the segmentation process.

3. The image processing apparatus as set forth in claim 1, wherein:

the density correction means includes (a) first density correction means for outputting the image data to the segmentation process means and (b) second density correction means for receiving the image data from the segmentation process means, and the processing mode control means instructs the first density correction means to carry out the density correction process in the first processing mode and the processing mode control means instructs the second density correction means to carry out the density correction process in the second processing mode.

4. The image processing apparatus as set forth in claim 1, wherein: the density correcting data is data corresponding to a conversion curve which indicates the density after correction in relation to the density before correction, or the density correcting data is data corresponding to a conversion function in accordance with which the density before correction is converted into the density after correction.

5. The image processing apparatus as set forth in claim 1, further comprising document type
discrimination means for estimating a type of the document by use of the image data and for
outputting a document type signal corresponding to the document type information
for indicating the type of the document.

6. The image processing apparatus as set forth in claim 1, wherein:

the document type information is inputted by a user.

7. An image forming apparatus, comprising the image processing apparatus as set forth in claim 1.

8. An image reading apparatus, comprising the image processing apparatus as set forth in claim 1.

9. An image processing apparatus, comprising:

first density correction means and second density correction means each of which performs a density correction process with respect to image data by referring to density correcting data which indicates a relation between density before correction and density after correction, the density correction process being a process in which density of a page background area included in an image corresponding to the image data is reduced;

segmentation process means for performing a segmentation process with respect to the image data; and processing mode control means for switching between (i) a first processing mode in which the segmentation process is performed with respect to the image data having been subjected to the density correction process carried out by the first density correction means and (ii) a second processing mode in which the segmentation process is performed with respect to image data having not been subjected to the density correction process carried out by the first density correction means and then the image data is subjected to the density correction process carried out by the second density correction means, wherein:

the image data is read out from a document, said document is a first document type which at least partially includes a continuous tone image area or a second document type which does not include a continuous tone image area, and the continuous tone image area is not an area constituted of halftone dots but an area whose tones are continuously made with silver particles or dye particles, and when receiving document type information indicating that the document from which the image data is being read out is of said first document type, the processing mode control means switches to said second processing mode to prevent an edge portion of the continuous tone image area from being wrongly detected as a text area, and when receiving document type information indicating that the document from which the image data being read out is of said second document type, the processing control means switches to said first processing mode to detect a text area with high accuracy.

10. An image processing method, comprising the steps of:

performing a segmentation process with respect to image data; and performing a density correction process with respect to the image data by referring to density correcting data which indicates a relation between density before correction and density after correction, the density correction process being a process in which density of a page background area included in an image corresponding to the image data is reduced;

said method switching between (i) a first processing mode in which the segmentation process is performed with respect to the image data having been subjected to the density correction process and (ii) a second processing mode in which the segmentation process is performed with respect to image data having not been subjected to the density correction process, wherein:

the image data is read out from a document, said document is a first document type which at least partially includes a continuous tone image area or a second document type which does not include a continuous tone image area, and the continuous tone image area is not an area constituted of halftone dots but an area whose tones are continuously made with silver particles or dye particles, and when receiving document type information indicating that the document from which the image data is being read out is of said first document type, the processing mode control means switches to said second processing mode to prevent an edge portion of the continuous tone image area from being wrongly detected as a text area, and when receiving document type information indicating that the document from which the image data being read out is of said second document type, the processing control means switches to said first processing mode to detect a text area with high accuracy.

11. A non-transitory computer-readable storage medium for storing an image processing program for operating an image processing apparatus which comprises:

segmentation process means for performing a segmentation process with respect to image data;

density correction means for performing a density correction process with respect to the image data by referring to density correction data which indicates a relation between density before correction and density after correction; the density correction process being a process in which density of a page background area included in an image corresponding to the image data is reduced; and processing mode control means for switching between (i) a first processing mode in which the segmentation process is performed with respect to the image data having been subjected to the density correction process and (ii) a second processing mode in which the segmentation process is performed with respect to image data having not been subjected to the density correction process, wherein:

the image data is read out from a document, said document is a first document type which at least partially includes a continuous tone image area or a second document type which does not include a continuous tone image area, the continuous tone image area is not an area constituted of halftone dots but an area whose tones are continuously made with silver particles or dye particles, and when receiving document type information indicating that the document from which the image data is being read out is of said first document type, the processing mode control means switches to said second processing mode to prevent an edge portion of the continuous tone image area from being wrongly detected as a text area, and when receiving document type information indicating that the document from which the image data being read out is of said second document type, the processing control means switches to said first processing mode to detect a text area with high accuracy.

* * * * *